Figures 1, 2, 3, 4, 5:
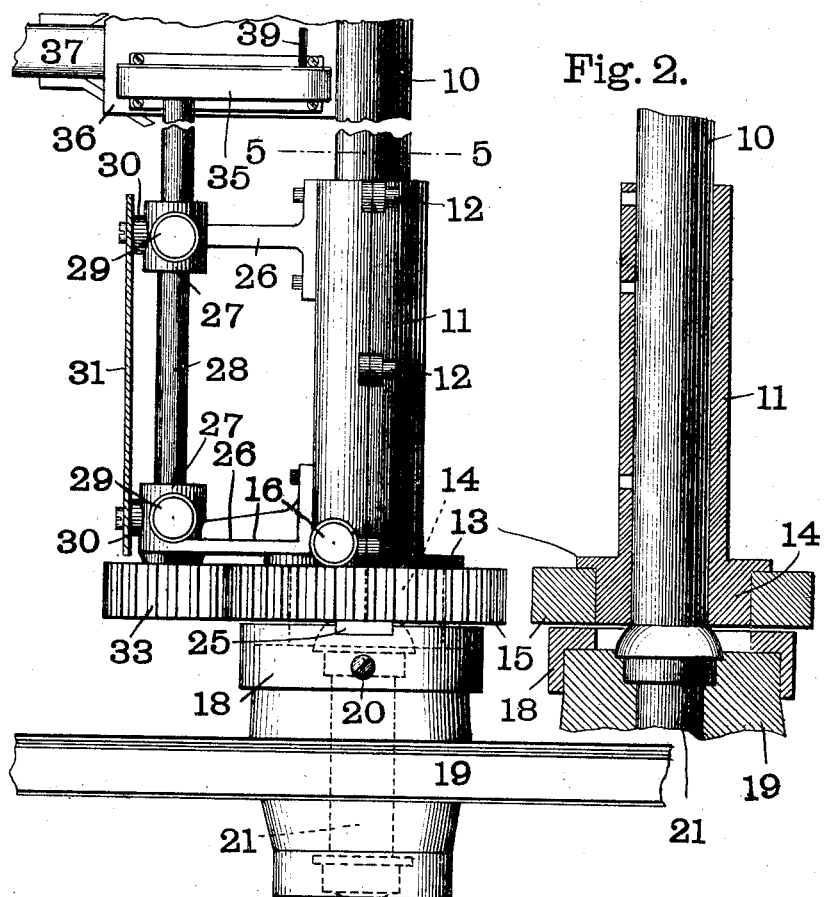

No. 765,979. PATENTED JULY 26, 1904.
J. A. LITTLE.
VEHICLE LIGHTING APPARATUS.
APPLICATION FILED NOV. 9, 1903.
NO MODEL.

Witnesses
F. Henke.
D. C. Betjeman.

Inventor
John A. Little
By Attorneys

No. 765,979. Patented July 26, 1904.

UNITED STATES PATENT OFFICE.

JOHN A. LITTLE, OF ST. LOUIS, MISSOURI, ASSIGNOR TO THE GLOBE ELECTRIC COMPANY, OF ST. LOUIS, MISSOURI, A CORPORATION OF MISSOURI.

VEHICLE-LIGHTING APPARATUS.

SPECIFICATION forming part of Letters Patent No. 765,979, dated July 26, 1904.

Application filed November 9, 1903. Serial No. 180,313. (No model.)

*To all whom it may concern:*

Be it known that I, JOHN A. LITTLE, a citizen of the United States, residing at the city of St. Louis, in the State of Missouri, have invented a certain new and useful Vehicle-Lighting Apparatus, of which the following is such a full, clear, and exact description as will enable any one skilled in the art to which it appertains to make and use the same, reference being had to the accompanying drawings, forming part of this specification.

My invention relates to an apparatus for driving a dynamo employed to furnish current to the lamps of a vehicle from the running-gear of such vehicle, and has for its objects to provide a simple and efficient train of gearing for such purpose, to so support the parts of the same that said parts will remain in alinement notwithstanding the strains to which the frame of the vehicle is subjected, and to so construct and arrange the apparatus that the vehicle-wheel may be removed from the vehicle without the necessity of disturbing the gearing.

In the drawings, in which like characters of reference refer to similar parts in the different views, Figure 1 is a top plan view of a portion of a vehicle embodying my invention. Fig. 2 is a horizontal section of a portion of Fig. 1. Fig. 3 is an isometric projection, partly in section, of the collar carried by the vehicle-wheel. Fig. 4 is an end view of the gearing and guard with the vehicle-wheel removed, and Fig. 5 is a vertical section on the line 5 5 of Fig. 1.

The axle 10 of the vehicle is surrounded by a sleeve 11, made in two parts and fastened together by screws at 12, thus firmly clamping the sleeve upon the axle. The outer end of the sleeve 11 is enlarged to form a flange 13 and a journal 14. Upon this journal 14 a gear-wheel 15 is adapted to rotate.

16 is an oil-cup for lubricating the bearing.

18 indicates a collar fastened upon the hub of the vehicle-wheel 19 and held in place by means of a set-screw 20.

21 indicates the journal of the vehicle-axle, upon which the vehicle-wheel 19 is mounted. This collar 18, which is more fully shown in projection in Fig. 3, is provided at one side with a groove 23, which fits over the inner end of the hub, and has at the opposite side two notches or keyways 24, into which corresponding keys 25, carried by the side of the gear-wheel 15, are adapted to enter.

26 indicates brackets fastened to one side of the sleeve or casing 11 and carrying journals 27, in which the shaft 28 is adapted to rotate.

29 indicates oil-cups for lubricating the journals 27.

30 indicates bosses upon the journals 27, to which a curved dust-guard 31 is fastened. The guard 31 extends over the gearing, as best shown in Fig. 4.

33 is a driven gear-wheel rigidly mounted upon the shaft 28 and meshing with the gear-wheel 15. The inner end of the shaft 28 is connected with the gearing in the gear-casing 35, mounted on a plate 36, carried by the vehicle-frame, a portion of which is shown at 37. This gearing forms no part of the present invention. 39 indicates the armature-shaft of a dynamo-electric machine which is adapted to be rotated from the shaft 28 through the medium of the gearing in the casing 35.

The operation of my invention is as follows: When the vehicle is in motion, the rotation of the vehicle-wheel 19 drives the gear-wheel 15, to which said vehicle-wheel is keyed. This in turn drives the gear-wheel 33, which rotates the dynamo-armature by means of the shaft 28 and the gearing in the casing 35. When it is desired to remove the vehicle-wheel 19 for oiling the bearing 21 or for any other purpose, it is evident that the same may be done without disturbing the gearing, since the gear-wheel 15 is not dependent for its support upon the vehicle-wheel 19, but is supported independently of such vehicle-wheel upon the journal 14, carried by the member or sleeve 11 upon the axle of the vehicle.

I am aware that in vehicles where both the axle and the wheel rotate together gear-wheels for driving dynamo-electric machines have been fastened upon the rotating axle, and I am also aware that gear-wheels for driving dynamo-electric machines have been fastened upon and supported by the hub of vehicle-wheel to rotate with said wheel, and I therefore do not claim such constructions, as in neither case can the wheel be removed from the vehicle without disturbing the gear-train.

Having fully described my invention, what I claim as new, and desire to secure by Letters Patent of the United States, is—

1. The combination with a non-rotatable axle, of a driving-wheel rotatably mounted thereon, a member rigidly carried by said axle, and a second wheel mounted on said member and keyed to said driving-wheel to rotate therewith.

2. The combination with an axle, of a wheel mounted thereon and movable relative thereto, a support carried by said axle, a second wheel journaled on said support and connected with said first-named wheel to rotate therewith, and a wheel carried by said support and connected with said second wheel.

3. The combination with an axle, of a vehicle-wheel mounted thereon and rotatable relative thereto, a support carried by said axle, a second wheel journaled on said support and attached to said vehicle-wheel to rotate therewith, a driven wheel carried by said support and meshing with said second wheel, and a guard carried by said support.

4. The combination with a non-rotatable vehicle-axle, of a vehicle-wheel rotatably mounted thereon, a rotary member mounted on said axle and connected with said vehicle-wheel to rotate therewith and separable therefrom, and driving-gear actuated by said rotary member.

5. The combination with a non-rotatable vehicle-axle, of a sleeve rigidly mounted on said axle, a rotary member mounted on said sleeve, a vehicle-wheel mounted on said axle and connected with said rotary member to rotate the same, and driving-gear actuated by said rotary member.

6. The combination with a non-rotatable vehicle-axle, of a sleeve rigidly mounted on said axle, a rotary member mounted on said sleeve, a vehicle-wheel mounted on said axle and connected with said rotary member to rotate the same but separable therefrom, and driving-gear actuated from said rotary member.

7. The combination with a non-rotatable vehicle-axle, of a sleeve composed of a plurality of parts, means for clamping said sleeve around said axle, a rotary member mounted on said sleeve, a vehicle-wheel mounted on said axle and connected with said rotary member to rotate the same, and driving-gear actuated from said rotary member.

8. The combination with a non-rotatable vehicle-axle, of a sleeve rigidly mounted on said axle, a rotary member mounted on said sleeve, a vehicle-wheel mounted on said axle and connected with said rotary member to rotate the same, a shaft supported from said sleeve, and means for driving said shaft from said rotary member.

9. The combination with a non-rotatable vehicle-axle, of a sleeve rigidly mounted on said axle, a gear-wheel mounted on said sleeve, a vehicle-wheel mounted on said axle and connected with said gear-wheel to rotate the same, brackets carried by said sleeve, a shaft mounted in said brackets, and a gear-wheel rigidly secured to said shaft and meshing with said first-named gear-wheel.

10. The combination with a non-rotatable vehicle-axle, of a rotary member mounted on said axle, and a vehicle-wheel rotatably mounted on said axle, one of said rotatable parts being provided with a tongue and the other with a groove to receive said tongue.

11. The combination with a non-rotatable vehicle-axle, of a sleeve rigidly mounted on said axle, a rotatable member mounted on said sleeve, and a vehicle-wheel rotatably mounted on said axle, one of said rotatable members being provided with a tongue and the other being provided with a groove to receive said tongue.

12. The combination with a non-rotatable vehicle-axle, of a gear-wheel mounted on said axle, a vehicle-wheel mounted on said axle, and a cap carried by the hub of said vehicle-wheel, said cap being provided with a groove, and said gear-wheel being provided with a tongue engaging therewith.

In testimony whereof I have hereunto set my hand and affixed my seal in the presence of the two subscribing witnesses.

JOHN A. LITTLE. [L. S.]

Witnesses:
D. C. BETJEMAN,
JAMES H. BRYSON.